(No Model.)
C. LA DOW.
HARROW.
No. 433,573. Patented Aug. 5, 1890.
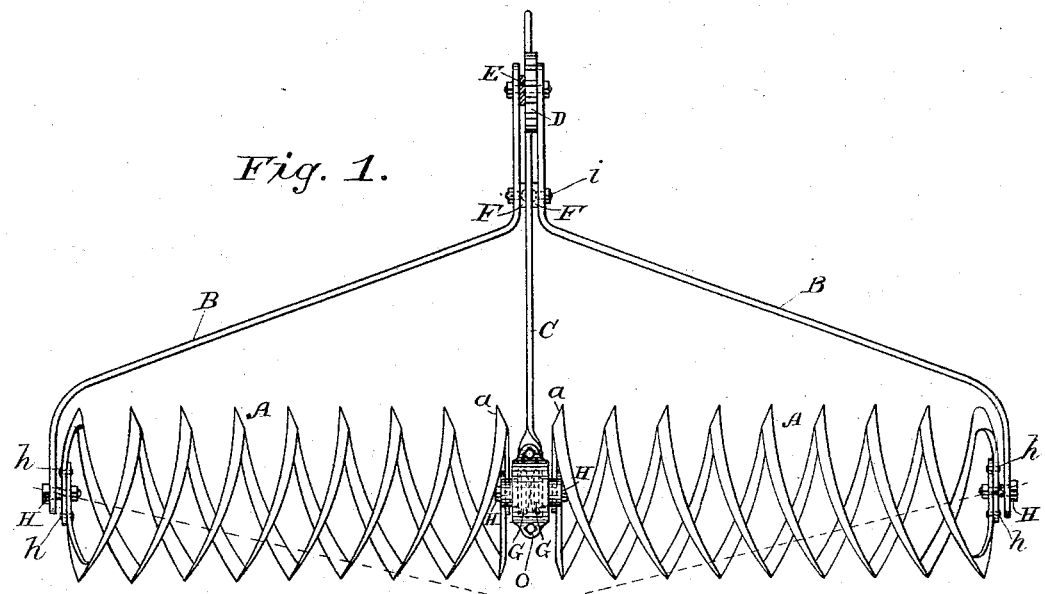
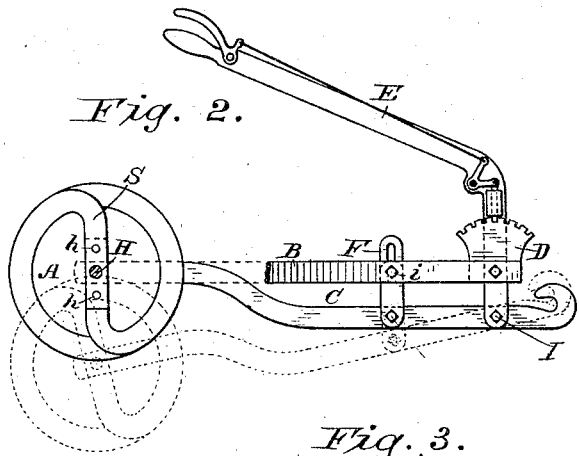
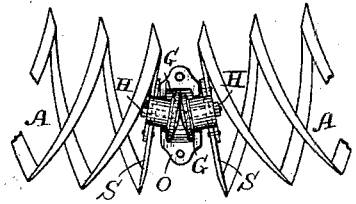
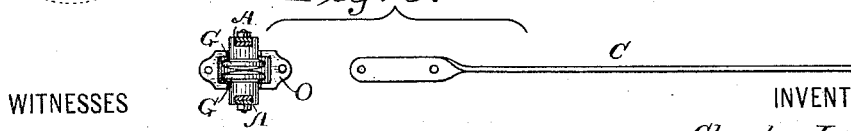
WITNESSES
E. A. Newman,
C. M. Newman.
INVENTOR
Charles La Dow,
By his Attorneys
Baldwin, Hopkins & Peyton

UNITED STATES PATENT OFFICE.

CHARLES LA DOW, OF ALBANY, NEW YORK.

HARROW.

SPECIFICATION forming part of Letters Patent No. 433,573, dated August 5, 1890.

Application filed October 25, 1886. Serial No. 217,133. (No model.)

*To all whom it may concern:*

Be it known that I, CHARLES LA DOW, of the city and county of Albany, New York, have invented new and useful Improvements in Pulverizing-Harrows, of which the following is a specification.

My invention relates to that class of harrows which employ revolving spiral or screw cutters arranged in two opposing gangs.

In the drawings, Figure 1 represents a top view of my invention, showing by two broken lines the direction in which the gangs may be angled, so as to throw the earth outward from center of machine. Fig. 2 is an end view showing by dotted lines the vibratory action of the gangs in a vertical direction. Fig. 3 is a detail view of the coupling-box between the gangs, the buffer within said box for counteracting the side-thrust of the gangs, also showing the draw-bar for connecting the coupling-box to the adjusting mechanism on the draft-frame. Fig. 4 is a sectional view of the inner ends of the gangs when set at an angle and showing the action of the buffers.

The gangs are composed of bands of thin metal A, coiled spirally, so as to form a double screw made dishing, and having their edges beveled or sharpened. The double spirals in each gang are attached together at their outer and inner ends by rivets $h\ h$, the spirals being mounted on each other by the bars S S (shown as forming straight radial prolongations of the ends of spirals) instead of on a frame, as heretofore. The bars S S may be formed out of part of the coils, or separate bars may be riveted to the coils instead. This construction permits the cutting-coils of the gang to spring with a vibrating motion, which motion is varied by the obstructions met or the character of the soil over which the implement is drawn. This spring motion tends to throw off all sticky soil, which would clog the spirals were they incapable of vibration. It will be observed that the spirals have no axles or other frame-work to be clogged by the soil operated upon. B B are the hounds or draft-frame bars, which are each attached to the outer ends of their gangs by the journal-pin H. The forward ends of the bars B B are attached together, forming a triangular frame.

C is a draw-bar attached to the center box O and to the ratchet-lever E. By moving this lever the gangs may be angled or brought into line relatively to each other. The front end of the draw-bar C is provided with a draft-hook; but the animals may be attached to the triangle in other ways.

F is a slotted link arranged to permit the inner ends of the gangs to vibrate downward, but preventing them from rising above a level by the pin $i$ striking the bottom of the slot in said link. This link and the lower end of the lever E act as parallel arms to cause the rod C to move endwise on a horizontal plane when adjusted, so that the link will exert equal pressure at all angles of the gangs.

G G are buffers attached to the inner ends of the spirals and arranged to counteract the side-thrust of the gangs when set at an angle to each other. The buffers have flattened convex abutting surfaces, so as to abut at any angle to which they may be set. These buffers revolve within the center box, which is shaped to permit the revolution, vertical vibration, and horizontal adjustment of the buffers within it. The vertical vibration of the draw-bar is on the pin I, and the shape of the hounds, together with the slotted link, forms a stop to limit the vertical vibration of the gangs.

The team being hitched to the front end of the triangular frame, they can turn the laterally-extending gangs around a corner more easily than if a pole were employed, and the hounds B are shaped to act as guards to protect the legs of the horses from being cut by the spirals. The lower end of the lever E is placed far enough in advance of the spirals to assist in coacting with the draft-frame to form a stop to limit the vertical vibration of the gangs, while the upper end of said lever is brought rearward far enough to permit its adjustment when the attendant is behind the gangs.

The draft-bearings are at the extreme ends of the gangs and give the greatest possible leverage against the draft.

The entire structure is preferably made of metal, and is very light, cheap, and effective.

In another application, a division of this case, filed June 8, 1887, I have shown a machine of the identical construction of that herein claimed, and I hereby disclaim is this case any subject-matter claimed in said divisional case.

What I claim is—

1. In a pulverizer, a draft-frame B B, attached to the outer end of each gang of cutters, in combination with the draw-bar C, adapted to have horizontal and vertical motion.

2. In a pulverizer, two frameless gangs of laterally-extending revolving cutters, in combination with a triangular frame in which they are mounted by their outer and inner ends.

3. In a screw pulverizer, the combination of the horizontally-adjustable gangs A A, and the hounds B B, located in advance of said gangs in substantially the same horizontal plane with the gangs and adapted to act as shields for the gangs at any angle to which they may be adjusted.

4. In a screw pulverizer, the combination of the horizontally-adjustable cutters arranged on opposite sides of the draft-line, in combination with a poleless frame consisting of the hounds B B and draw-rod C, substantially as set forth.

5. In a pulverizer, two gangs of vertically-vibrating cutters, a draft-frame attached to their extreme outer ends, and a draw-bar attached to their inner ends, in combination with a stop arranged between the draft-frame and draw-bar for limiting the upward movement of the inner ends of the gangs.

6. In a pulverizer, two gangs of cutters, a draft-frame, and a draw-bar C, in combination with parallel arms attached to the draw-bar for causing it to move on a uniform horizontal plane when adjusted.

7. The combination of the gangs, the draw-bar, the draft-frame, and the parallel link-connection between the frame and draw-bar, substantially as set forth.

CHARLES LA DOW.

Witnesses:
S. G. SPEIR,
H. V. HATTON.